US008345036B2

(12) United States Patent
Muramatsu

(10) Patent No.: US 8,345,036 B2
(45) Date of Patent: Jan. 1, 2013

(54) DISPLAY METHOD, DISPLAY SYSTEM, MOBILE COMMUNICATION TERMINAL, AND DISPLAY CONTROLLER

(75) Inventor: Eiji Muramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 740 days.

(21) Appl. No.: 12/442,980

(22) PCT Filed: Sep. 27, 2007

(86) PCT No.: PCT/JP2007/068895
§ 371 (c)(1), (2), (4) Date: Mar. 26, 2009

(87) PCT Pub. No.: WO2008/047568
PCT Pub. Date: Apr. 24, 2008

(65) Prior Publication Data

US 2010/0073353 A1 Mar. 25, 2010

(30) Foreign Application Priority Data

Sep. 27, 2006 (JP) ................................ 2006-261708

(51) Int. Cl.
*G06F 3/038* (2006.01)

(52) U.S. Cl. ........................................ 345/213; 345/698

(58) Field of Classification Search .................. 345/102, 345/98, 3.3–3.4; 348/333.11, 14.12, 208.13; 349/82
See application file for complete search history.

(56) References Cited

U.S. PATENT DOCUMENTS 5,068,732 A * 11/1991 Satoh ............................ 348/748
6,577,322 B1 * 6/2003 Fukuda ......................... 345/698
6,999,131 B2 * 2/2006 Kishimoto et al. ........... 348/705

FOREIGN PATENT DOCUMENTS

| | | | |
|---|---|---|---|
| EP | 1128357 | A | 8/2001 |
| JP | 1994149181 | A | 5/1994 |
| JP | 1999015428 | A | 1/1999 |
| JP | 2941409 | B | 8/1999 |
| JP | 2002244610 | A | 8/2002 |
| JP | 2004357028 | A | 12/2004 |
| JP | 2006208450 | A | 8/2006 |
| JP | 2006235151 | A | 9/2006 |

OTHER PUBLICATIONS

International Search Report for PCT/JP2007/068895 mailed Oct. 30, 2007.
Supplementary European Search Report for EP 07 82 8641 issued Oct. 11, 2010.
K. Maeda et al., "Multi-Resolution for Low Power Mobile AMLCD", 2002 SID International Symposium Digest of Technical Papers, XP001134320, 2002, pp. 794-797.

* cited by examiner

*Primary Examiner* — Alexander Eisen
*Assistant Examiner* — Robin Mishler

(57) ABSTRACT

When there is a circuit that has to wait for one frame cycle to switch LCD resolution, a user feels uncomfortable because the resolution is switched while the screen is temporarily turned off and blackened or while the screen does keep display but causes flickers. When the user switches to an application that will display in QVGA mode on the LCD while the LCD is displaying in VGA mode, a synchronization signal, etc. are stopped from being output from an LCD controller within a vertical blank period (step S2). Then, a pseudo vertical synchronization signal whose cycle falls within the vertical blank period is generated by the LCD controller to trigger a circuit in a par/ser converting circuit triggered by a vertical synchronization signal (steps S3 to S5), and to realize resolution switching (steps S6 to S8). This prevents blackening/flickering of the screen when the resolution is switched.

17 Claims, 5 Drawing Sheets

DISPLAY METHOD, DISPLAY SYSTEM, MOBILE COMMUNICATION TERMINAL, AND DISPLAY CONTROLLER

The present application is the National Phase of PCT/JP2007/068895, filed Sep. 27, 2007, which is based upon and claims priority from Japanese Patent Application No. 2006-261708 filed on Sep. 27, 2006, the disclosure of which is incorporated herein in its entirety.

TECHNICAL FIELD

The present invention relates to a display method, a display system, a portable communication terminal, and a display controller for dynamically switching the display on a display device that has a function for allowing enlarged display.

BACKGROUND ART

Portable phones that cater to demands for a wider screen, a higher resolution, and lower power consumption include those on which an LCD panel having a VGA size (640×480 pixels) is mounted. The controlling unit of such a portable phone selects either a VGA mode in which image are displayed on the whole LCD panel based on display data for VGA size (640×480 pixels) or a QVGA mode in which images are displayed on the whole LCD panel based on display data for QVGA size (320×240 pixels), and displays images on the LCD panel at the resolution of the selected mode.

In the QVGA mode, the area (the number of pixels) over which an image is displayed based on a display data is four times as large (twice as large in both the vertical direction and the horizontal direction) as that in the VGA mode. Therefore, the QVGA mode is also called four times enlarging mode.

The VGA mode requires four times as many display data as required in the QVGA mode. Hence, the VGA mode imposes a heavier processing load on the driver that drives the LCD panel and on the Central Processing Unit (CPU) that controls the LCD panel and the driver, and causes them to consume more power. Therefore, it is preferable that the mode selection should switch to the VGA mode when the higher resolution is required, and to the QVGA mode when the higher resolution is not required, that is, when it is hard for the user to feel the effect of the VGA mode. The following will explain a first conventional portable phone and a second conventional portable phone, both of them display images on the LCD panel at the resolution of a selected mode.

The first conventional portable phone includes: an LCD panel that displays images corresponding to supplied serial data at the resolution of a designated mode; a parallel/serial converting circuit that converts supplied parallel data to serial data and supplies it to the LCD panel; an LCD controller that converts supplied data to parallel data corresponding to the resolution of a designated mode and supplies the data to the parallel/serial converting circuit; and a control unit that supplies data to the LCD controller, and supplies a signal that designates a mode to the LCD panel, the parallel/serial converting circuit, and the LCD controller.

The parallel/serial converting circuit is prepared for reducing the number of signal lines between the LCD controller and the LCD panel. The parallel/serial converting circuit takes a time period of 1 VBlank (one frame cycle) from when it is instructed to switch the modes until when it finishes the switching.

The second conventional portable phone has basically the same configuration as the first conventional portable phone, except that it has no parallel/serial converting circuit. Specifically, the second conventional portable phone includes: an LCD panel that displays images corresponding to supplied data at the resolution of a designated mode; an LCD controller that converts supplied data to data corresponding to the resolution of a designated mode and supplies it to the LCD panel; and a control unit that supplies data to the LCD controller, and supplies a signal that designates a mode to the LCD panel and the LCD controller.

However, note that the LCD controller of the second conventional portable phone, unlike the LCD controller of the first conventional portable phone, has a circuit that takes a time period of 1 VBlank from when it is instructed to switch the modes until when it finishes the switching.

The first conventional portable phone and the second conventional portable phone will cause a flicker on the screen of the LCD panel, unless they simultaneously switch, when switching the modes, the data and the mode designating signal both to be supplied to the LCD panel, because a failure to simultaneously switch them spoils the correspondence between the data and the mode. However, as described above, since some time is taken from when the parallel/serial converting circuit or the LCD controller is instructed to switch the modes until when it finishes the switching, there is a gap between the timing at which the data to be supplied to the LCD panel is switched and the timing at which the mode designating signal to be supplied to the LCD panel is switched, and the screen of the LCD panel thus flickers.

To solve this problem, the first conventional portable phone performs, for example, a liquid crystal display process shown in the flowchart of FIG. 5. Note that a liquid crystal display process performed by the second conventional portable phone is a changed version of the flowchart shown in FIG. 5, in which changing the setting of the parallel/serial converting circuit (step S103) is skipped, and waiting for one cycle to reflect the setting (step S104) comes after switching the LCD controller to the QVGA mode (step S106). Here, to avoid repetitive description, the liquid crystal display process performed by the first conventional portable phone will only be explained.

The control unit controls the LCD panel to display images in the VGA mode (step S101). Next, the control unit turns OFF the display on the LCD panel so as not to flicker the screen during mode switching (step S102).

Next, the control unit issues an instruction to change the setting of the parallel/serial converting circuit to the setting for the QVGA mode (step S103). Then, to reflect the setting, the control unit waits for one cycle. (1 VBlank period) until the setting change is completed in the parallel/serial converting circuit (step S104).

Next, the control unit switches the LCD panel to the QVGA mode (step S105). Further, the control unit switches the LCD controller to the QVGA mode (step S106).

Next, the control unit turns ON the display on the LCD panel (step S107). Then, the control unit controls the LCD panel to resume display in the QVGA mode (step S108). Since the control unit turns the screen of the LCD panel OFF (black) while switching modes at steps S103 to S106, the screen can be prevented from flickering.

Patent Literature 1 discloses a liquid crystal display device that prevents flickers on the screen by a method different from those taken by the first conventional portable phone and the second conventional portable phone. The liquid crystal display device disclosed in Patent Literature 1 is provided with a switching element in each pixel defined at the intersections where a plurality of scanning electrodes and a plurality of signal electrodes meet, and scans through the scanning electrodes to select them sequentially by a first drive circuit while supplying an image signal via the switching elements to the pixels corresponding to the selected scanning electrodes from a second drive circuit via the signal electrodes. The device stops the scanning operation for a certain frame period, and during this stopping period, displays the image of the frame before the stop. Hence, it is possible to realize a liquid crystal display device that uses no frame memory to make no disturbed image show up on the screen.

Further, Patent Literature 2 discloses a display device that prevents flickers on the screen by a method different from those taken by the first conventional portable phone, the second conventional portable phone, and the liquid crystal display device disclosed in Patent Literature 1. The display device disclosed in Patent Literature 2 switches modes between a normal power consumption mode and a low power consumption mode. In the normal power consumption mode, the device displays display data supplied by a display controller on a liquid crystal display element, while in the low power consumption mode, the device retains display data supplied by the display controller in a memory, stops the display controller, and then displays the display data retained in the memory on the liquid crystal display element. The device has a flicker prevention circuit that stops the display on the liquid crystal display element when the normal power consumption mode and the low power consumption mode are switched.

Patent Literature 1: Unexamined Japanese Patent Application KOKAI Publication No. 2002-244610

Patent Literature 2: Japanese Patent No. 2941409

DISCLOSURE OF INVENTION

Problem to be Solved by the Invention

The first conventional portable phone requires a time period of 1 VBlank to switch modes in the parallel/serial converting circuit. The second conventional portable phone requires a time period of 1 VBlank to switch modes in the LCD controller. Hence, any of these portable phones has to temporarily turn off the screen and turn it black when switching the modes, in order to prevent flickers on the screen. However, users feel uncomfortable because the screen temporarily goes black.

The liquid crystal display device disclosed in Patent Literature 1 needs to have a special configuration or function to retain display data in the gate driver and timing generator for the LCD panel, which makes the circuit complicated. The display device disclosed in Patent Literature 2 needs to have a memory in the LCD panel for retaining display data, which makes the circuit larger and increases the costs.

Not only LCD panels, but also the whole variety of display devices that can switch display modes, such as EL display panels, plasma display panels, etc. cannot avoid this kind of problems.

An object of the present invention is to prevent flickers or black screen display when a display device switches its display modes.

Another object of the present invention is to display a high-quality image even when a display device switches its display modes.

Means for Solving the Problem

To achieve the above objects, a display method according to a first invention is a display method for switching a display resolution of a display device, which can display at an arbitrarily set resolution of a plurality of resolutions, to a desired resolution, by switching a frequency of a clock signal output from a circuit, which supplies the display device with the clock signal, a synchronization signal, and an image signal, to a frequency matched to the display resolution, while using the synchronization signal to trigger this frequency switching, and includes:

a first step (step S2) of stopping the circuit from outputting the synchronization signal to the display device;

a second step (step S4) of making a setting for switching the frequency of the clock signal from the circuit to a frequency matched to a display resolution of the display device after switching;

a third step (step S6) of making the setting for switching the frequency of the clock effective, by generating a pseudo synchronization signal having a cycle shorter than a blank period of the vertical synchronization signal and supplying the circuit with the generated pseudo synchronization signal;

a fourth step (step S9) of switching the display resolution of the display device to the desired resolution; and a fifth step (step S11) of, after the pseudo synchronization signal is output, starting supplying the synchronization signal to the display device via the circuit.

For example, the second step, the third step, the fourth step, and the fifth step are performed within a blanking period of the synchronization signal that comes before the display resolution is switched (i.e., an assumed blanking period that had come if the synchronization signal had been kept output).

For example, at the third step, the pseudo synchronization signal is output for one cycle.

For example, it is preferable that one cycle of the pseudo synchronization signal is longer than a time period required for the clock signal, which has been switched, to be stable.

For example, the circuit switches to the frequency matched to the display resolution as triggered by the synchronization signal in response to a vertical synchronization signal, the second step, the third step, the fourth step, and the fifth step are performed within a blanking period of the vertical synchronization signal that comes before the display resolution is switched, and the pseudo synchronization signal is supplied to the circuit as the vertical synchronization signal.

For example, the circuit is a par/ser converting circuit: that is supplied, in parallel, with display target image signals with three primary colors, and performs parallel-serial conversion by converting the image signals from parallel signals to serial signals primary-color by primary-color, and outputting the converted signals to the display device; and that is triggered by a vertical synchronization signal input thereto, and outputs, in synchronization with the vertical synchronization signal input thereto, the clock signal having the frequency matched to the display resolution of the display device.

To achieve the above objects, a second invention is a display system that switches a display resolution of a display device, which can display at an arbitrarily set resolution of a plurality of resolutions, to a desired resolution, by switching a frequency of a clock signal output from a circuit, which supplies the display device with the clock signal, a synchronization signal, and an image signal, to a frequency matched to the display resolution, while using the synchronization signal to trigger this frequency switching, and includes:

a display controller that stops outputting the synchronization signal, and during a period in which outputting is stopped, generates and outputs a pseudo synchronization signal having a cycle shorter than a blank period of the synchronization signal, and after the period, outputs the synchronization signal and image signals matched to a resolution after switching;

a circuit that is supplied with the image signals and the synchronization signal from the display controller, and as triggered by the synchronization signal, outputs a clock signal having a frequency matched to the resolution after switching together with the image signals and the synchronization signal input thereto to the display device; and a control unit that controls the display controller, changes a setting for the frequency at which the circuit outputs the clock signal such that the frequency matches the display resolution of the display device after switching, and switches the display resolution of the display device to the desired resolution.

For example, the circuit is a parallel-serial converting circuit: that is supplied, in parallel, with display target image signals with three primary colors, and performs parallel-serial conversion by converting the image signals to serial signals primary-color by primary-color, and outputting the converted signals to the display device; and that is triggered by the synchronization signal supplied thereto to output the clock signal having the frequency matched to the display resolution of the display device.

For example, the display device is a display device that performs display at an arbitrarily set one of a first resolution and a second resolution, the second resolution is twice as large an image size of the first resolution both in a vertical direction and in a horizontal direction, and the control unit performs control of stopping outputting of the synchronization signal output from the display controller and generating and outputting the pseudo synchronization signal, when an application that performs display at the second resolution is selected while display is performed at the first resolution.

For example, stopping outputting the synchronization signal, making the setting for the frequency of the clock, making the setting for the frequency of the clock signal effective by outputting the pseudo synchronization signal, and canceling the stopping outputting the synchronization signal are performed at a timing corresponding to a blanking period of the synchronization signal that has been output until immediately before.

The display controller outputs the pseudo synchronization signal, for example, for one cycle.

It is preferable that one cycle of the pseudo synchronization signal is longer than a time period required from when the pseudo synchronization signal is output until when the frequency of the clock signal output from the circuit becomes stable.

For example, the circuit switches to the frequency matched to the display resolution as triggered by the synchronization signal in response to a vertical synchronization signal, and the pseudo synchronization signal is supplied to the circuit as the vertical synchronization signal.

To achieve the above objects, a third invention is a portable communication terminal that has at least a function for sending/receiving an e-mail and a function for performing voice communication with another terminal, and that displays various images, symbols, and characters on a display device that can display at an arbitrarily set resolution of a plurality of resolutions, and includes:

a display controller that, when switching a display resolution of the display device to a desired resolution, stops outputting a vertical synchronization signal within a blank period of the vertical synchronization signal, and during this period in which outputting is stopped, generates and outputs a pseudo vertical synchronization signal having a cycle shorter than the blank period of the vertical synchronization signal, and after the period, outputs the vertical synchronization signal and image signals matched to the desired resolution;

a circuit: to which the image signals and a synchronization signal including the vertical synchronization signal are input from the display controller; whose setting change is made effective by the vertical synchronization signal; and which outputs a clock signal having an externally set frequency, together with the input image signals and synchronization signal, to the display device; and control means that controls the display controller, sets the frequency at which the circuit outputs the clock signal such that the frequency matches the display resolution of the display device after switching, and switches the display resolution of the display device to the desired resolution.

For example, the circuit is a par/ser converting circuit: that is supplied, in parallel, with display target image signals with three primary colors, and performs parallel-serial conversion by converting the image signals to serial signals primary-color by primary-color, and outputting the converted signals to the display device; and that is triggered by the vertical synchronization signal input thereto to output, in synchronization with the vertical synchronization signal input thereto, the clock signal having the frequency matched to the display resolution of the display device.

The display device is a display device that performs display at an arbitrarily set one of a first resolution and a second resolution, the second resolution is twice as large an image size of the first resolution both in a vertical direction and in a horizontal direction, so totally four times as large, and the control means performs control of stopping outputting of the vertical synchronization signal output from the display controller and generating and outputting the pseudo vertical synchronization signal, when an application that performs display at the second resolution is selected while display is performed at the first resolution.

A display controller according to a fourth aspect of the present invention is a display controller that has a function for coping with switching of a resolution of a display device, the display controller once stops, in response to a signal instructing to switch a resolution, outputting a synchronization signal within a blanking period in a prior displaying state, and during this period in which outputting is stopped, outputs a pseudo synchronization signal having a cycle shorter than a blank period of the synchronization signal, and after the period, outputting the synchronization signal and image signals matched to the resolution after switching.

According to the present invention, it is possible to suppress degradation of display when switching display modes.

EXPLANATION OF REFERENCE NUMERALS

Figure 1:
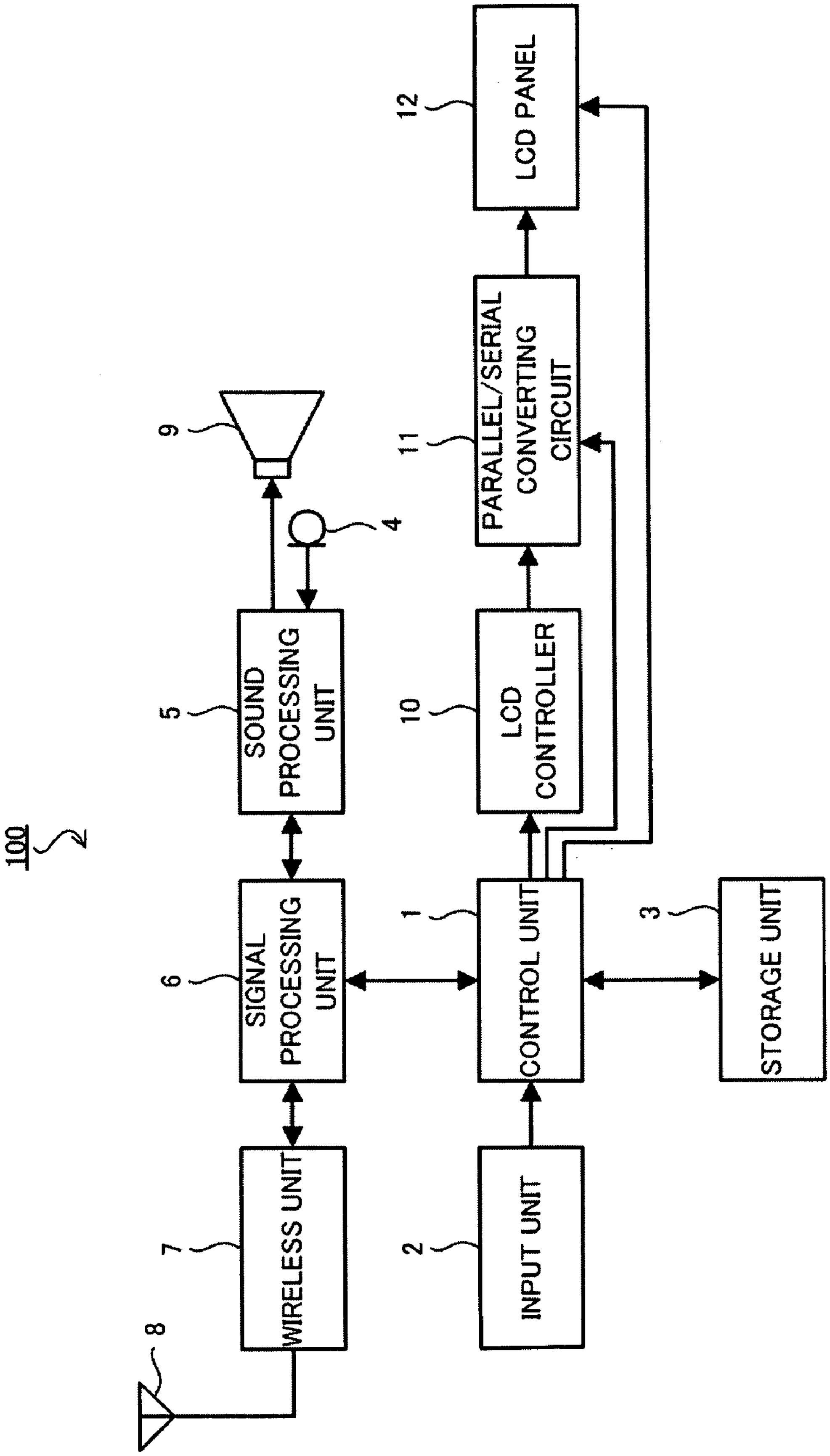
FIG. 1 It is a block diagram of a portable phone according to one embodiment of the present invention.

1 control unit
2 input unit 3 storage unit
4 sound input unit
5 sound processing unit
6 signal processing unit
7 wireless unit
8 antenna
9 sound output unit
10 LCD controller
11 parallel/serial converting circuit
12 LCD panel
13 clock generator

BEST MODE FOR CARRYING OUT THE INVENTION

Next, a portable phone according to an embodiment of the present invention will be explained with reference to the drawings.

The present embodiment will take up a portable phone as one example of a communication device. The portable phone 100 includes, as a display unit, a liquid crystal display panel (LCD panel), and the display method of the LCD panel is characteristic. FIG. 1 is a block diagram of a portable phone 100 according to one embodiment of the present invention.

The portable phone 100 includes a control unit 1, an input unit 2, a storage unit 3, a sound input unit 4, a sound processing unit 5, a signal processing unit 6, a wireless unit 7, a sound output unit 9, an LCD controller 10, a parallel/serial converting circuit 11, and an LCD panel 12.

The control unit 1 comprehensively controls each unit in the portable phone, and is constituted by a Central Processing Unit (CPU), etc.

The input unit 2 has various keys for entering various information such as characters, symbols, etc., and for making entries for operational controls.

The storage unit 3 stores programs, telephone directory data, etc.

The sound input unit 4 collects voices on an outbound call, and outputs a sound signal to the sound processing unit 5.

The sound processing unit 5 processes a sound signal input by the sound input unit 4 or a sound signal to be output to the sound output unit 9.

The signal processing unit 6 processes outbound signals and inbound signals.

The wireless unit 7 communicates wirelessly with the nearest base station (unillustrated) via an antenna 8.

The sound output unit 9 has a speaker or the like and outputs voices on an inbound call, etc.

The LCD controller 10 controls the LCD panel 12 by arbitrarily changing the resolution and a synchronization signal adaptively to the LCD panel 12 connected thereto.

The LCD panel 12 cannot change the number of physical pixels arranged on the display screen, but can change the resolution (the number of data pieces to be input) and displays various images with a function for enabling an enlarged display matched to the resolution.

The parallel/serial converting circuit (hereinafter, denoted as "par/ser converting circuit") 11 is arranged between the LCD controller 10 and the LCD panel 12 for such purposes as reducing the number of signal lines, etc., and converts parallel input signals supplied thereto through a plurality of input signal lines that lead out from the LCD controller 10 to serial signals and outputs them to the LCD panel 12. Based on the control of the control unit 1, the par/ser converting circuit 11 can output or stop outputting a synchronization signal in response to switching of display modes, or can make setting required for switching the frequency of a clock signal (transfer clock).

The portable phone 100 inputs, to the control unit 1, a signal corresponding to a dialed number entered from the input unit 2 when an outbound call is made, and a predetermined inbound call answering operation signal when an inbound call is received. In response to these input signals, the control unit 1 wirelessly sends a signal to an unillustrated nearest base station via the signal processing unit 6, the wireless unit 7, and the antenna 8, and further establishes a phone communication path from the base station to the communication partner's terminal via a public network, etc. by following a predetermined sequence.

After once the phone communication path is established, a phone communication signal from the communication partner's terminal is caught by the antenna 8 via the public network and the base station, and received by the wireless unit 7. After this, the signal is converted by the signal processing unit 6 to an inbound call sound signal, and passed to the sound processing unit 5 before being supplied to the sound output unit 9, by which the signal is then electro-acoustically converted and output as voices on the inbound call. On the other hand, voices on an outbound call are acousto-electrically converted by the sound input unit 4 to an outbound call sound signal, and supplied to the wireless unit 7 via the sound processing unit 5 and the signal processing unit 6. The outbound call voices are converted to an outbound signal in a predetermined frequency band, wirelessly sent to the base station via the antenna 8, and further sent from the base station to the communication partner's terminal via the public network, etc.

Further, the control unit 1 converts, by the signal processing unit 6, e-mail text made up of character data entered from the input unit 2 to a signal in a predetermined format. The control unit 1 wirelessly sends the converted e-mail text in the predetermined format to a base station via the wireless unit 7 and the antenna 8. The base station sends this e-mail text to an unillustrated e-mail server or the like via a public network, etc. The wireless unit 7 receives, via the antenna 8, an inbound e-mail addressed to itself, which is wirelessly sent from a based station, processes it, and supplies it to the control unit 1 via the signal processing unit 6.

The control unit 1 supplies character data corresponding to the received e-mail text to the LCD controller 10. Note that when sending an outbound e-mail, character data of the e-mail text to be sent is also supplied to the LCD controller 10. Further, not only is the character data of the e-mail text supplied to the LCD controller 10, but also any symbol or image data entered from the input unit 2 is supplied thereto. Furthermore, character and image data that the control unit 1 generates using the data stored in the storage unit 3 in accordance with an instruction entered from the input unit 2 is also supplied to the LCD controller 10.

The LCD controller 10 generates color signals having three primary colors of red (R), green (G), and blue (B) respectively in a manner that the signals match the data input thereto, and outputs the signals in parallel. Here, it is possible to supply the color signals having the three primary colors from the LCD controller 10 directly to the LCD panel 12 in parallel. However, the color signals having the three primary colors, namely, for example, the R signal having 5 bits, the G signal having 6 bits, and the B signal having 5 bits, which are to be output in parallel from the LCD controller 10, are transferred through signal lines prepared one line per bit. Therefore, 16 signal lines are required to transfer these color signals having the three primary colors, and a blank signal, a clock (transfer clock), and a GND signal, etc. also need to be transferred, which require additional 3 to 5 signal lines, thereby ending up in many signal lines.

Since these signal lines are laid through the inside of a hinge of the portable phone, it is more advantageous if these lines are fewer in terms of mounting convenience. Hence, the par/ser converting circuit 11 converts the color signals having the three primary colors output in parallel from the LCD controller 10 to serial signals in order to reduce the number of signal lines. Specifically, the par/ser converting circuit 11 converts each of the R signal, the G signal, and the B signal input thereto to serial signal each having 1 bit, and outputs the converted serial signals to the LCD panel 12 at a clock (transfer clock) speed that is 6 times higher than the speed at which it has received the signals. The signal lines for the three primary color signals output from the par/ser converting circuit 11 to the LCD panel 12 become vulnerable to noises because the clock (transfer clock) speed (frequency) is 6 times higher. To mitigate this, the signal lines for the three primary color signals each have a twisted pair line to parallely transfer a differential signal (a signal having either positive or negative polarity that is opposite to the color signal), so each primary color signal takes 2 lines and a total of 6 lines are used to transfer them.

The LCD panel 12 converts the three primary color signals supplied serially by the par/ser converting circuit 11 to again parallel signals by a serial/parallel converting circuit incorporated therein. The LCD panel 12 drives each of a plurality of pixels arranged in a matrix form by a vertical driver (row driver) and a horizontal driver (column driver), and displays characters and images corresponding to the entered data.

In the following explanation, it is assumed that as the display modes (resolutions) of its LCD panel 12 having the VGA size (physically, 640×480 pixels), the portable phone 100 has a VGA mode in which images are displayed based on display data for the VGA size (640×480 pixels), and a QVGA mode (four times enlarging mode) in which images are displayed based on display data for the QVGA size (320×240 pixels). Note that the size of the LCD panel 12 and the resolution of each mode are not limited to the above. Display panels of various sizes, for example, 690×480 pixels, 800×480 pixels, 854×480 pixels, etc. may be used, and modes of various resolutions may be prepared to match.

Next, the configuration and operation of principal parts that relate to the switching of the display modes of the LCD 12 will be explained with reference to FIG. 2 to FIG. 4. As described above, what make the portable phone 100 characteristic are the display method and configuration used by a liquid crystal display section, which includes the LCD controller 10, the par/ser converting circuit 11, and the LCD panel 12. Therefore, this display method will be explained in detail.

The LCD controller 10 includes a plurality of counters 101, etc., which are supplied with a fundamental clock signal ϕ by a clock generator 13 and generate such signals as a vertical synchronization signal, a horizontal synchronization signal, etc. The count value, etc. of each counter 101 can be appropriately set in accordance with a control signal from the control unit 1. Therefore, taking a vertical synchronization signal for example, the LCD controller 10 can output a vertical synchronization signal that has a given pulse width and a given cycle set by the control unit 11.

The parallel/serial converting circuit 11 includes a counter 111, etc., which are supplied with a fundamental clock signal ϕ by the clock generator 13 and generate a transfer clock. The parallel/serial converting circuit 11 switches operation modes in response to a mode designating signal from the control unit 1. A setting (parameter) for the transfer clock made by the control unit 1 into the counter 111 is made effective in response to a rise of the vertical synchronization signal from the LCD controller 10, which causes a new operation mode to be set in the parallel/serial converting circuit 11, which thus outputs a transfer clock having a frequency corresponding to the new operation mode.

The control unit 1 supplies signals to the LCD controller 10, the parallel/serial converting circuit 11, etc. to control them and set parameters to them. The fundamental clock ϕ makes the control unit 1 operate in synchronization with the LCD controller 10 and the parallel/serial converting circuit 11. The control unit 1 monitors the synchronization signals, etc. output by the LCD controller 10 to adjust its operation timing.

Figure 2:
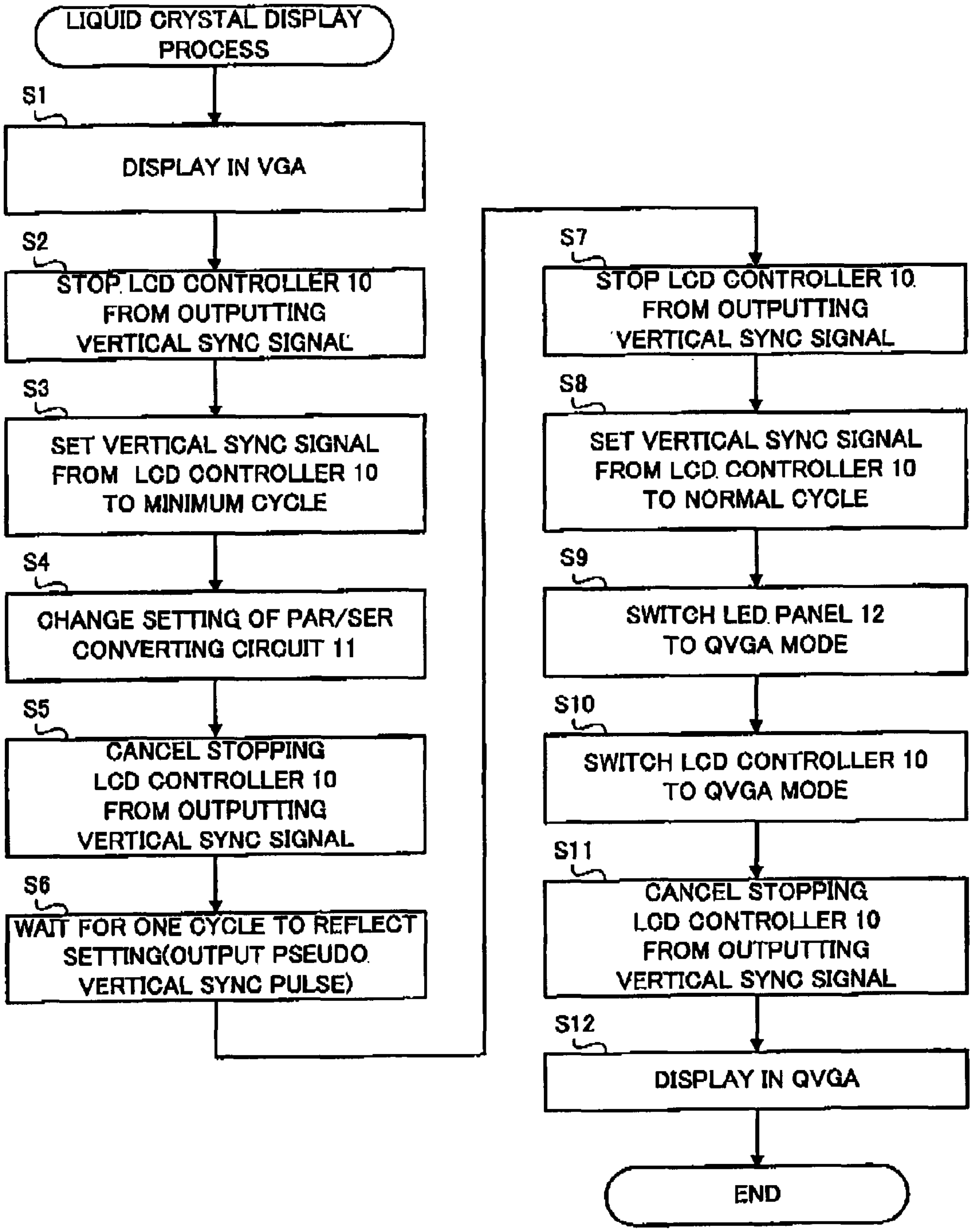
FIG. 2 It is a flowchart showing one example of a liquid crystal display process of the portable phone shown in FIG. 1.
Figure 3:
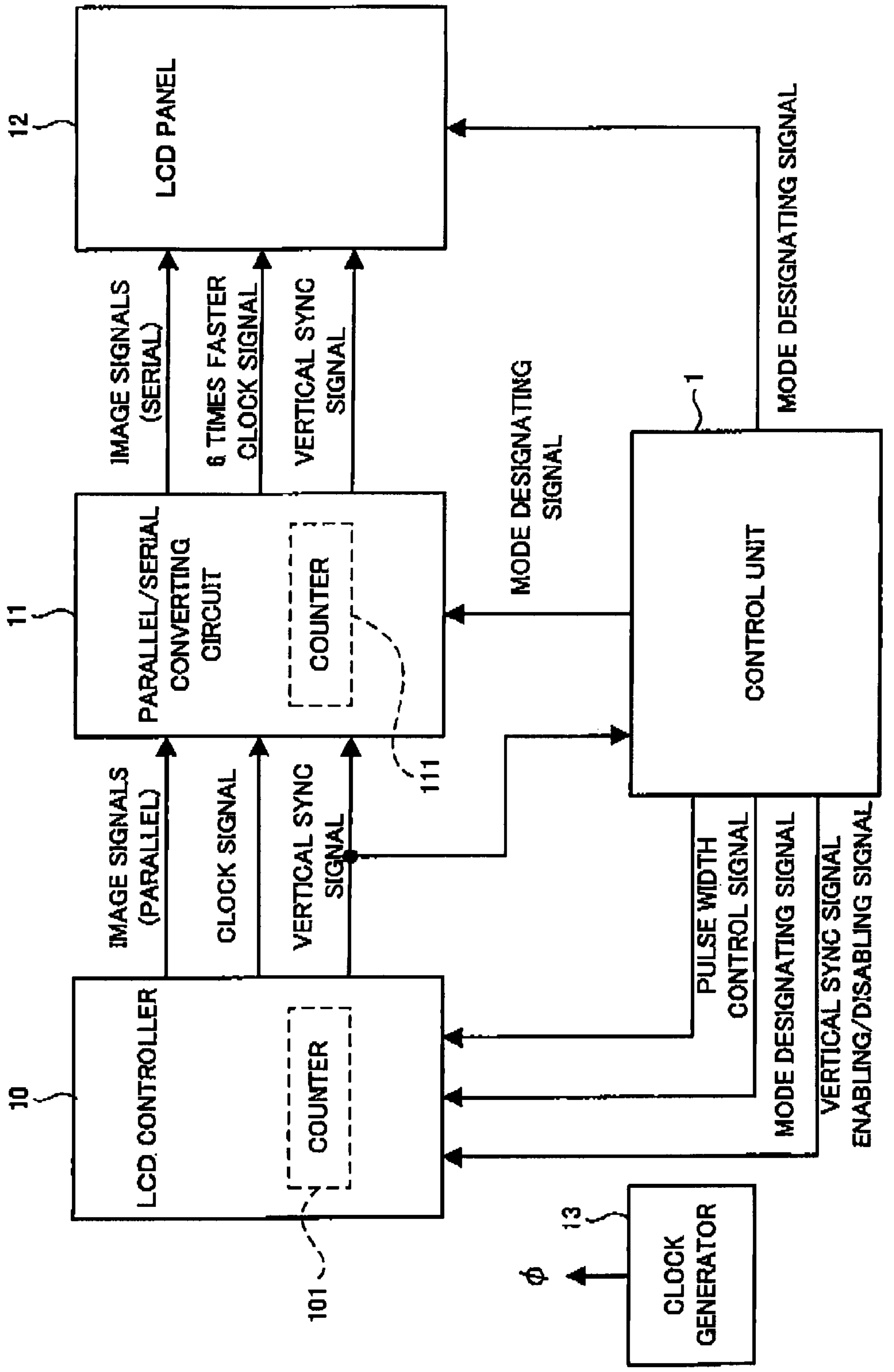
FIG. 3 It is a diagram for explaining principal parts of the portable phone shown in FIG. 1.

The flowchart shown in FIG. 2 illustrates a display process of the liquid crystal display section when switching applications of the portable phone 100 from an application that displays images in the VGA mode to an application that displays images in the QVGA mode. Note that any application will display images in the VGA mode, if the application can benefit from the VGA mode in terms of power saving and software programming man-hour saving. This includes applications such as full browser that make many characters and images appear within one frame, and applications that can, with more pixels, make images such as standby images and moving images look nice. On the other hand, any application for displaying temporary images such as a pop-up window, and a battery icon and an antenna icon on the top row of the screen, or for displaying easily-recognizable simple diagrams will display images in the QVGA mode.

First, the control unit 1 causes the LCD panel 12 to display in the VGA mode (step S1). Specifically, the control unit 1 supplies the LCD controller 10, the par/ser converting circuit 11, and the LCD panel 12 with a mode designating signal that designates the VGA mode as a display mode to make them operate in the VGA mode.

Figure 4A:
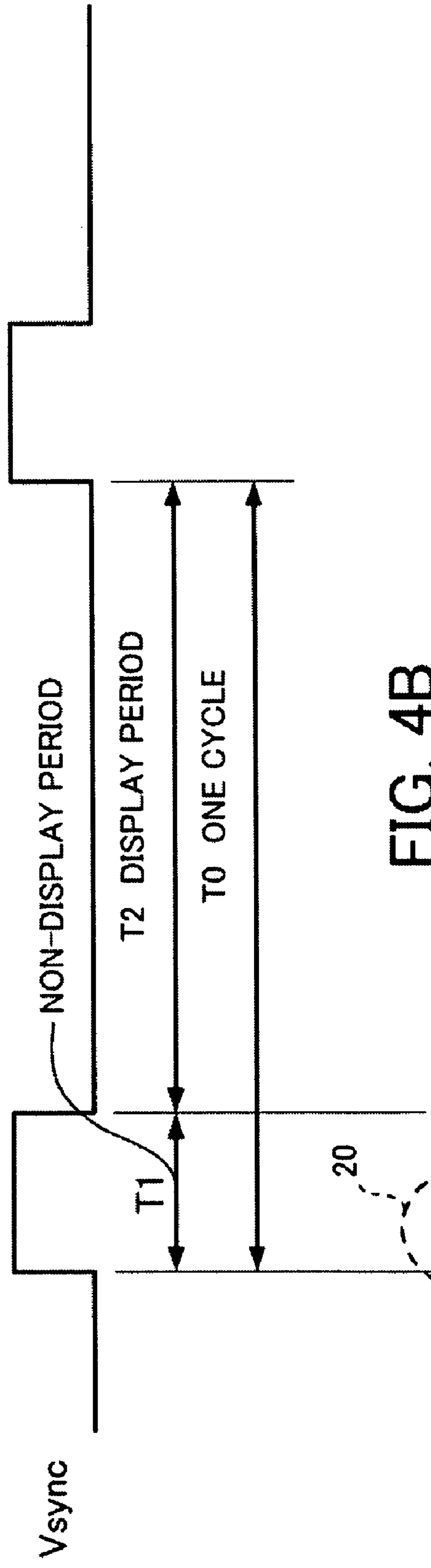
FIG. 4 It is a diagram for detailed explanation of how to switch a synchronization signal.

In the state in which the LCD panel 12 is displaying in the VGA mode, the LCD controller 10 is supplying a vertical synchronization signal (vertical blanking signal) VBlank as shown in FIG. 4A, an unillustrated horizontal synchronization signal, etc. to the LCD panel 12 via the par/ser converting circuit 11. In FIG. 4A, the high-level period is a vertical blank period (non-display period) T1, and the remaining low-level period is a display period T2. The sum of them, i.e., the period T0 is one vertical period (one frame cycle).

When, while the LCD panel 12 is displaying in the VGA mode, the user switches to an application (e.g., a menu screen) that will display images on the LCD panel 12 in the QVGA mode (four times enlarging mode), the control unit 1 starts a process for switching the display modes.

First, the control unit 1 outputs a vertical synchronization signal disabling signal that instructs to stop outputting the vertical synchronization signal to the LCD controller 10 (step S2).

Though the control unit 1 may output a vertical synchronization signal disabling signal at any timing, it is preferable that it outputs the signal, for example, in synchronization with when the vertical synchronization signal is output, or immediately before the vertical synchronization signal is output (during the latter half of a display period).

Hence, the LCD controller 10 will not output a vertical synchronization signal (a high-level pulse) even when a vertical blank period (non-display period) T1 shown in FIG. 4A starts. Accordingly, no vertical synchronization signal will be supplied to the LCD panel 12.

Note that in a vertical blank period (non-display period) T1, R, G, and B three primary color signals concerning the images to be displayed are not output from the LCD controller 10. Even after the vertical synchronization signal is stopped from being output at step S2, the LCD panel 12 will continue displaying the same as before, while waiting for a signal.

Subsequently, the control unit 1 controls the LCD controller 10 to set therein a parameter that makes the cycle of the vertical synchronization signal as short as possible (step S3).

Then, a setting is made to change the clock speed of the clock output by the par/ser converting circuit 11 to a speed that matches a mode after the switching (step S4). Then, the control unit 1 outputs a vertical synchronization signal enabling signal to the LCD controller 10 (step S5).

Figure 4B:
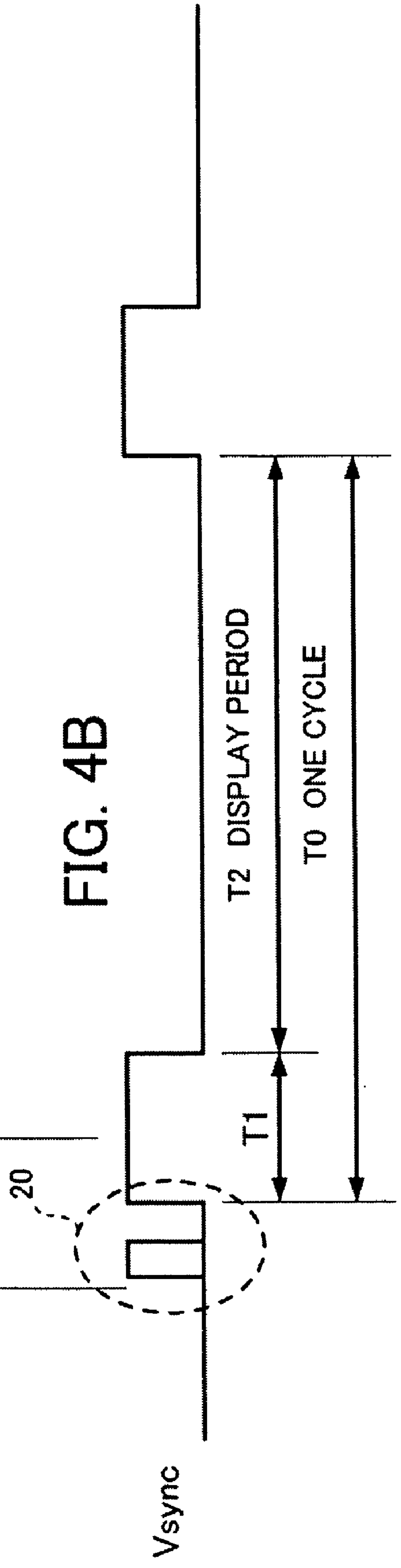
Figure 5:
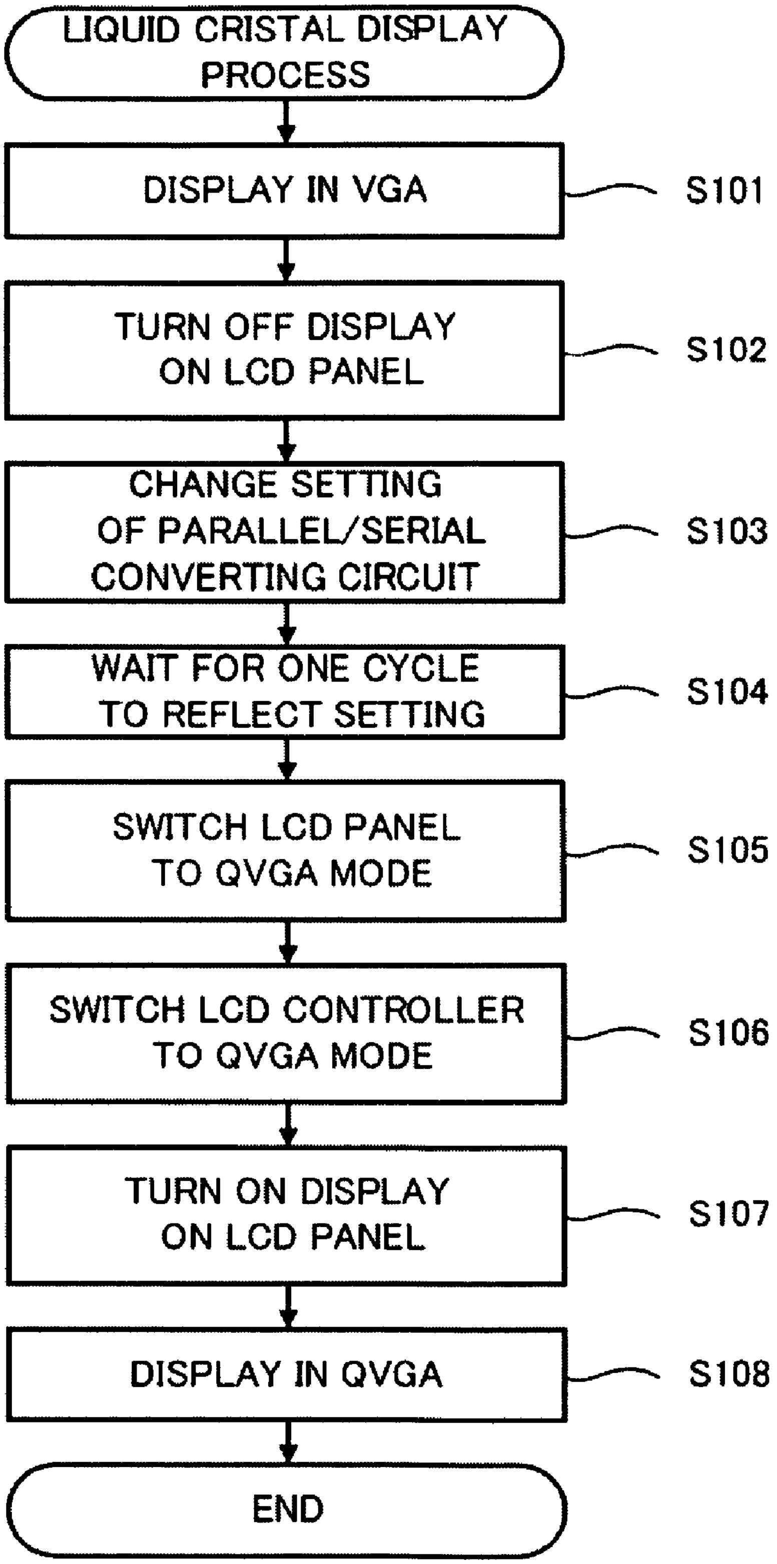
FIG. 5 It is a flowchart showing a conventional liquid crystal display process.

In response to the vertical synchronization signal enabling signal, the LCD controller 10 generates a pseudo vertical synchronization signal 20 shown in FIG. 4B having a cycle T11 much shorter than the genuine one cycle T0.

The LCD controller 10 triggers a predetermined internal circuit section of it with this pseudo vertical synchronization signal 20, and also supplies the pseudo vertical synchronization signal 20 to the par/ser converting circuit 11.

Among the internal circuits of the par/ser converting circuit 11, those that perform a predetermined operation as triggered by the vertical synchronization signal (those that have to wait for the so-called 1 VBlank period (one frame cycle)) are triggered by the pseudo vertical synchronization signal 20. This makes the setting for changing the clock speed (frequency) effective (i.e., waiting state is kept for one frame cycle so that the setting can be reflected) (step S6).

The length of the short one cycle T11 described above is set to be equal to or longer than a period of time required for the clock signal having the clock speed of the setting after the change to be stable. Specifically, it is set to be longer than a time taken from when an operation parameter is set in the counter 111 until when the cycle of the clock to be output becomes stable.

Then, the control unit 1 outputs, to the LCD controller 10, a vertical synchronization signal disabling signal that instructs to stop outputting the vertical synchronization signal to the LCD controller 10 (step S7).

Then, the control unit 1 controls the LCD controller 10 and sets therein a parameter that makes the cycle of the vertical synchronization signal equal to the normal cycle T0 (step S8).

Then, the control unit 1 switches the operation mode of the LCD panel 12 to the QVGA mode (step S9). In response to this mode switching, the LCD controller 10 switches its operation mode to the QVGA mode and starts outputting a clock signal (pixel clock) having a predetermined frequency for the QVGA mode, and R, G, and B three primary color signals concerning the images to be displayed (step S10).

Then, the control unit 1 outputs a vertical synchronization signal enabling signal to the LCD controller 10 (step S11).

In response to this, the LCD controller 10 outputs a vertical synchronization signal having the normal cycle T0 successively to the pseudo vertical synchronization signal 20, as shown in FIG. 4B. After this, the vertical synchronization signal having the genuine cycle T0 shown in FIG. 4A is output, and a clock signal that is synchronous with the vertical synchronization signal is output from the par/ser converting circuit 11. This enables the LCD panel 12 to display in the QVGA mode (step S12).

As can be seen, according to the present embodiment, the par/ser converting circuit 11 that has to wait for a 1 VBlank period (one fame cycle) necessitates some waiting for the setting, but the period for this waiting lasts for the short one cycle T11, which is sufficiently shorter than the non-display period T1. After this, ordinary setting for the QVGA mode is made at steps S7 to S10, to start outputting the synchronization signals (step S11). Therefore, it is possible to switch resolutions while keeping the LCD panel 12 in the displaying state without turning off the display, with neither flickering nor blackening of the screen. Accordingly, it is possible to make the user enjoy substantial impact and merits of the increased resolution, without making the user feel uncomfortable.

At step S2, the vertical synchronization signal may be disabled at any timing, but it is preferable that the timing is concurrent with or slightly earlier than the start of a vertical blank period.

The present invention is not limited to the above embodiment. For example, the display resolutions are not limited to QVGA and VGA, but other resolutions (e.g., 640×480, 690×480, 800×480, 854×480, 1024×760, etc.) are possible. In the above embodiment, the par/ser converting circuit 11 has been explained as a circuit that needs to wait for 1 VBlank. However, the present invention can be applied to all other circuits that need to wait for 1 VBlank, such as a chromatic calibration circuit, etc. that switch in every one frame cycle.

Furthermore, for example, in the above explanation, the cycle of the vertical synchronization pulse after the pseudo vertical synchronization signal 20 is output lasts for the normal, one cycle. However, for example, the length of the cycle of the vertical synchronization pulse that comes after the pseudo vertical synchronization signal 20 is output may be T0-T11, and the succeeding cycles of vertical synchronization pulses may be the normal T0.

For facilitating understanding, the above embodiment has shown an example in which the synchronization signals and the transfer pulse are output by means of the counters that count the fundamental clock $\phi$. However, the synchronization pulses and clock pulse may be generated by another configuration, for example, a logic circuit. It is discretionary how to realize the circuit.

The above embodiment has explained the present invention by taking up an LCD that can switch display modes for an example. However, the present invention can be provided for any display devices and display systems. For example, the present invention can be applied to plasma display devices, electroluminescence (EL) display devices, etc. That is, the present invention can be widely applied to examples that involve a circuit of a type that makes the setting (parameter) for the frequency of the transfer clock effective when triggered by a synchronization signal.

Likewise, the procedure shown in FIG. 2 for setting the circuit, etc. may be appropriately changed. The cycle of the pseudo synchronization pulse may also be appropriately set if the setting process can be completed within a vertical blanking period (i.e., can be completed at a timing at which a blanking period is assumed to have had occurred if the vertical synchronization signal had been kept output).

The present invention can be applied to other portable terminal devices than the portable phone used in the above embodiment, that can select a plurality of communication means, such as Personal Handyphone System (PHS), Personal Digital Assistants (PDA), etc. The present invention can also be applied to land-line phones, personal computers, etc., that can select a plurality of communication means.

The present invention has been explained with reference to the embodiment, but the present invention is not limited to the above embodiment. Various changes that can be understood by a person skilled in the art within the scope of the present invention can be made unto the configuration and details of the present invention.

Industrial Applicability

The present invention can be applied to various devices and methods that employ a display device that has a function for switching display modes.

The invention claimed is:

1. A display method for switching a display resolution of a display device, which can display at an arbitrarily set resolution of a plurality of resolutions, to a desired resolution, by switching a frequency of a clock signal output from a circuit, which supplies said display device with the clock signal, a synchronization signal, and an image signal, to a frequency matched to the display resolution, while using the synchronization signal to trigger this frequency switching, comprising:

a first step of stopping said circuit from outputting the synchronization signal to said display device;

a second step of making a setting for switching the frequency of the clock signal from said circuit to a frequency matched to a display resolution of said display device after switching;

a third step of making the setting for switching the frequency of the clock effective, by generating a pseudo synchronization signal having a cycle shorter than a blanking period of the synchronization signal and supplying said circuit with the generated pseudo synchronization signal;

a fourth step of switching the display resolution of said display device to the desired resolution; and a fifth step of, after the pseudo synchronization signal is output, starting supplying the synchronization signal to said display device via said circuit.

2. The display method according to claim 1, wherein said second step, said third step, said fourth step, and said fifth step are performed within a blanking period of the synchronization signal that comes before the display resolution is switched.

3. The display method according to claim 1, wherein at said third step, the pseudo synchronization signal is output for one cycle.

4. The display method according to claim 1, wherein one cycle of the pseudo synchronization signal is longer than a time period required for the clock signal, which has been switched, to be stable.

5. The display method according to claim 1, wherein said circuit switches to the frequency matched to the display resolution as triggered by the synchronization signal in response to a vertical synchronization signal, said second step, said third step, said fourth step, and said fifth step are performed within a blanking period of the vertical synchronization signal that comes before the display resolution is switched, and the pseudo synchronization signal is supplied to said circuit as the vertical synchronization signal.

6. The display method according to claim 1, wherein said circuit is a par/ser converting circuit: that is supplied, in parallel, with display target image signals with three primary colors, and performs parallel-serial conversion by converting the image signals from parallel signals to serial signals primary-color by primary-color, and outputting the converted signals to said display device; and that is triggered by a vertical synchronization signal input thereto, and outputs, in synchronization with the vertical synchronization signal input thereto, the clock signal having the frequency matched to the display resolution of the display device.

7. A display system that switches a display resolution of a display device, which can display at an arbitrarily set resolution of a plurality of resolutions, to a desired resolution, by switching a frequency of a clock signal output from a circuit, which supplies said display device with the clock signal, a synchronization signal, and an image signal, to a frequency matched to the display resolution, while using the synchronization signal to trigger this frequency switching, comprising:

a display controller that stops outputting the synchronization signal, and during a period in which outputting is stopped, generates and outputs a pseudo synchronization signal having a cycle shorter than a blanking period of the synchronization signal, and after the period, outputs the synchronization signal and image signals matched to a new resolution after switching;

a circuit that is supplied with the image signals and the synchronization signal from said display controller, and as triggered by the synchronization signal, outputs a clock signal having a frequency matched to the resolution after switching together with the image signals and the synchronization signal input thereto to said display device; and a control unit that controls said display controller, changes a setting for the frequency at which said circuit outputs said clock signal such that the frequency matches the display resolution of said display device after switching, and switches the display resolution of said display device to the desired resolution.

8. The display system according to claim 7, wherein said circuit is a parallel/serial converting circuit: that is supplied, in parallel, with display target image signals with three primary colors, and performs parallel-serial conversion by converting the image signals to serial signals primary-color by primary-color, and outputting the converted signals to said display device; and that is triggered by the synchronization signal supplied thereto to output the clock signal having the frequency matched to the display resolution of said display device.

9. The display system according to claim 7, wherein said display device is a display device that performs display at an arbitrarily set one of a first resolution and a second resolution, said second resolution is twice as large an image size of the first resolution both in a vertical direction and in a horizontal direction, and said control unit performs control of stopping outputting of the synchronization signal output from said display controller and generating and outputting the pseudo synchronization signal, when an application that performs display at the second resolution is selected while display is performed at the first resolution.

10. The display system according to claim 7, wherein stopping outputting the synchronization signal, making the setting for the frequency of the clock, making the setting for the frequency of the clock signal effective by outputting the pseudo synchronization signal, and canceling the stopping outputting the synchronization signal are performed at a timing corresponding to a blanking period of the synchronization signal that has been output until immediately before.

11. The display system according to claim 7, wherein said display controller outputs the pseudo synchronization signal for one cycle.

12. The display system according to claim 7, wherein one cycle of the pseudo synchronization signal is longer than a time period required from when the pseudo synchronization signal is output until when the frequency of the clock signal output from said circuit becomes stable.

13. The display system according to claim 7, wherein said circuit switches to the frequency matched to the display resolution as triggered by the synchronization signal in response to a vertical synchronization signal, and the pseudo synchronization signal is supplied to said circuit as the vertical synchronization signal.

14. A portable communication terminal that has at least a function for sending/receiving an e-mail and a function for performing voice communication with another terminal, and that displays various images, symbols, and characters on a display device that can display at an arbitrarily set resolution of a plurality of resolutions, comprising:

a display controller that, when switching a display resolution of said display device to a desired resolution, stops outputting a vertical synchronization signal within a blanking period of the vertical synchronization signal, and during this period in which outputting is stopped, generates and outputs a pseudo vertical synchronization signal having a cycle shorter than the blanking period of the vertical synchronization signal, and after the period, outputs the vertical synchronization signal and image signals matched to the desired resolution;

a circuit: to which the image signals and a synchronization signal including the vertical synchronization signal are input from said display controller; whose setting change is made effective by the vertical synchronization signal; and which outputs a clock signal having an externally set frequency, together with the input image signals and synchronization signal, to said display device; and control means that controls said display controller, sets the frequency at which said circuit outputs the clock signal such that the frequency matches the display resolution of said display device after switching, and switches the display resolution of said display device to the desired resolution.

15. The portable communication terminal according to claim 14, wherein said circuit is a par/ser converting circuit: that is supplied, in parallel, with display target image signals with three primary colors, and performs parallel-serial conversion by converting the image signals to serial signals primary-color by primary-color, and outputting the converted signals to said display device; and that is triggered by the vertical synchronization signal input thereto to output, in synchronization with the vertical synchronization signal input thereto, the clock signal having the frequency matched to the display resolution of said display device.

16. The portable communication terminal according to claim 14, wherein said display device is a display device that performs display at an arbitrarily set one of a first resolution and a second resolution, which is twice as large an image size of the first resolution both in a vertical direction and in a horizontal direction, so totally four times as large, and said control means performs control of stopping outputting of the vertical synchronization signal output from said display controller and generating and outputting the pseudo vertical synchronization signal, when an application that performs display at the second resolution is selected while display is performed at the first resolution.

17. A display controller that has a function for coping with switching of a resolution of a display device, said display controller once stopping, in response to a signal instructing to switch a resolution, outputting a synchronization signal within a blanking period in a prior displaying state, and during this period in which outputting is stopped, outputting a pseudo synchronization signal having a cycle shorter than a blanking period of the synchronization signal, and after the period, outputting the synchronization signal and image signals matched to the resolution after switching.

* * * * *